(12) United States Patent
Pain et al.

(10) Patent No.: US 7,030,356 B2
(45) Date of Patent: Apr. 18, 2006

(54) CMOS IMAGER FOR POINTING AND TRACKING APPLICATIONS

(75) Inventors: Bedabrata Pain, Los Angeles, CA (US); Chao Sun, San Marino, CA (US); Guang Yang, West Covina, CA (US); Julie B. Heynssens, Santa Clarita, CA (US)

(73) Assignee: California Institute of Technology, Pasadena, CA (US)

( * ) Notice: Subject to any disclaimer, the term of this patent is extended or adjusted under 35 U.S.C. 154(b) by 373 days.

(21) Appl. No.: 10/321,300

(22) Filed: Dec. 16, 2002

(65) Prior Publication Data

US 2003/0183850 A1    Oct. 2, 2003

Related U.S. Application Data

(60) Provisional application No. 60/340,567, filed on Dec. 14, 2001.

(51) Int. Cl.
 *H01I 27/00*   (2006.01)
(52) U.S. Cl. .................................... 250/208.1; 348/301
(58) Field of Classification Search ............. 250/208.1; 348/241, 294, 301–310
See application file for complete search history.

(56) References Cited

U.S. PATENT DOCUMENTS

| | | | |
|---|---|---|---|
| 4,262,258 A | 4/1981 | Gaalema et al. |
| 4,786,831 A | 11/1988 | Morse et al. |
| 4,890,267 A | 12/1989 | Rudolph |
| 5,175,802 A | 12/1992 | Crookshanks |
| 5,463,388 A | 10/1995 | Boie et al. |
| 5,471,515 A | 11/1995 | Fossum et al. |
| 5,576,763 A | 11/1996 | Ackland et al. |
| 5,648,642 A | 7/1997 | Miller et al. |
| 5,693,946 A | 12/1997 | Vickers et al. |
| 5,825,352 A | 10/1998 | Bisset et al. |
| 5,835,141 A | 11/1998 | Ackland et al. |
| 5,854,100 A | 12/1998 | Chi |
| 5,867,152 A | 2/1999 | Sextro |
| 5,962,844 A | 10/1999 | Merrill et al. |
| 6,058,223 A | 5/2000 | Strohbehn |
| 6,476,860 B1 | 11/2002 | Yadid-Pecht et al. |

OTHER PUBLICATIONS

Yang, David X. et al., Advanced Focal Plane Arrays and Electronic Cameras, Journal: Proc. SPIE vol. 2950, p. 8-17, Thierry M. Bernard; Ed., Oct. 1996.

Fox, Eric C. et al., Solid State Sensor Arrays; Development and Applications II, Journal: Proc. SPIE vol. 3301, p. 17-26, Morley M. Blouke; Ed., Jan. 1998.

*Primary Examiner*—Stephone B. Allen
(74) *Attorney, Agent, or Firm*—Fish & Richardson P.C.

(57) ABSTRACT

Systems and techniques to realize pointing and tracking applications with CMOS imaging devices. In general, in one implementation, the technique includes: sampling multiple rows and multiple columns of an active pixel sensor array into a memory array (e.g., an on-chip memory array), and reading out the multiple rows and multiple columns sampled in the memory array to provide image data with reduced motion artifact. Various operation modes may be provided, including TDS, CDS, CQS, a tracking mode to read out multiple windows, and/or a mode employing a sample-first-read-later readout scheme. The tracking mode can take advantage of a diagonal switch array. The diagonal switch array, the active pixel sensor array and the memory array can be integrated onto a single imager chip with a controller. This imager device can be part of a larger imaging system for both space-based applications and terrestrial applications.

36 Claims, 15 Drawing Sheets

CMOS IMAGER FOR POINTING AND TRACKING APPLICATIONS

CROSS REFERENCE TO RELATED APPLICATIONS

This application claims the benefit of the priority of U.S. Provisional Application Ser. No. 60/340,567, filed Dec. 14, 2001 and entitled "HIGH SPEED, HIGH DYNAMIC RANGE, LOW NOISE PHOTODIODE CMOS IMAGER FOR POINTING AND TRACKING APPLICATIONS".

STATEMENT AS TO FEDERALLY SPONSORED RESEARCH

The invention described herein was made in the performance of work under NASA contract number NAS7-1407, and is subject to the provisions of Public Law 96-517 (35 U.S.C. 202) in which the contractor has elected to retain title; the U.S. Government may have certain rights in this invention pursuant to NASA contract number NAS7-1407.

BACKGROUND

The present disclosure describes systems and techniques relating to semiconductor-based imaging devices, for example, a photodiode-based complementary metal oxide semiconductor (CMOS) imager.

Traditional image sensors, such as Charge Coupled Devices (CCDs) and CMOS image sensors, have been widely used for many different applications. In general, CMOS imagers can provide low-cost, low-power, reliable, highly integrated and miniaturized imaging systems. In addition, the availability of sub-micron processing technology, coupled with the advent of active pixel imaging concepts, has led to the development of high performance CMOS imagers.

CCD image sensors generally require more power than CMOS image sensors, are frequently more expensive, and are generally more limited in high-speed operation capabilities and signal handling capacity. In space-based applications, CCDs can generate centroiding errors due to radiation-hit, variable smear, and large power dissipation. However, CCDs are commonly used in many applications due to other advantages over CMOS imagers. For example, CCDs are commonly used in space-based applications, such as in space guidance and navigation systems, and deep-space optical communication systems, which require accurate and stable beam pointing for high speed data transfer. CCDs are frequently used in space-based applications because of their wide availability (CCDs have been used in space imaging applications since the 1970s), relatively low noise, fairly uniform response, and large dynamic range characteristics.

CCD chips are frequently used in star tracking applications. A star tracker is used by almost all spacecraft to determine three-axis attitude. A star tracker is an electronic camera connected to a computer. Using a sensed image of a portion of the sky, stars can be located and identified, and the orientation of the spacecraft can be determined based on these observations. Traditional CMOS imagers have typically been not well suited to such pointing and tracking applications.

Star trackers have been commercially available for more than a decade. Commercial star trackers typically have a mass of a few kilograms and a power consumption of approximately 10 Watts. Commercial star trackers can be made radiation tolerant up to approximately 100 KRads. Moreover, with a Charge Injection Device (CID) and extensive shielding, a star tracker can be made to withstand very high radiation levels (e.g., potentially up to 4 Mrads). However, CID chips tend to be very noisy, and are generally only desirable in extreme radiation environments.

SUMMARY

The present disclosure includes systems and techniques relating to CMOS imaging devices for use in pointing and tracking applications. According to an aspect, the technique includes sampling multiple rows and multiple columns of an active pixel sensor array into a memory array, and reading out the multiple rows and multiple columns sampled in the memory array to provide image data with reduced motion artifact. The memory array can be an on-chip analog memory array. Various operation modes may be provided, including Time Difference Sampling (TDS), correlated double sampling (CDS), correlated quadruple sampling (CQS), one or more tracking modes to read out multiple windows in the active pixel sensor array, and/or a mode employing a sample-first-read-later readout scheme.

The one or more tracking modes can take advantage of a diagonal switch array coupled between the active pixel sensor array and the memory array. The diagonal switch array, the active pixel sensor array and the memory array can be integrated onto a single imager chip with a controller (e.g., one or more on-chip control blocks). This imager device can be part of a larger imaging system for both space-based applications and terrestrial applications.

One or more of the following advantages may be provided. An imager architecture can provide integrated on-chip timing and control and A/D conversion in a CMOS imager resulting in a low-power device, with increased resistance to radiation, offering great advantages for space-based applications. The imager architecture can result in reduced complexity and reduced power requirements, as well as enhance system miniaturization. The imager can be a CMOS imager with multiple operating modes, including a star tracking mode with multiple data fetch from a single command. Thus, the systems and techniques described may result in a miniature low-power star tracker unit for use in next generation space guidance and navigation systems.

A CMOS photodiode imager using the disclosed architecture can be compatible with high speed pointing and tracking applications, while providing ultra-low noise during tracking of objects within one or more of multiple windows of interest. The CMOS imager can provide multi-window readout support from the same frame, and minimal smear and window-skew by using a sample-first-read-later mode of operation. An on-chip timing and control block can enable various program, configuration, sequencing, and readout functions, allowing readout of multiple windows with variable size from a single command. Moreover, the CMOS photodiode imager can provide high dynamic range, high quantum efficiency, and high operating speed, and can include a high performance imager pixel.

DRAWING DESCRIPTIONS

Details of one or more embodiments are set forth in the accompanying drawings and the description below. Other features and advantages may be apparent from the description and drawings, and from the claims.

DETAILED DESCRIPTION

The systems and techniques described here relate to CMOS imaging devices for use in pointing and tracking applications. The discussion below focuses on space-based implementations for star tracking and optical communications, but the systems and techniques described, which take advantage of VLSI system integration and of CMOS imaging technology, apply equally to other contexts, such as industrial robotics, machine vision, autonomous navigation, and various military applications.

Figure 1:
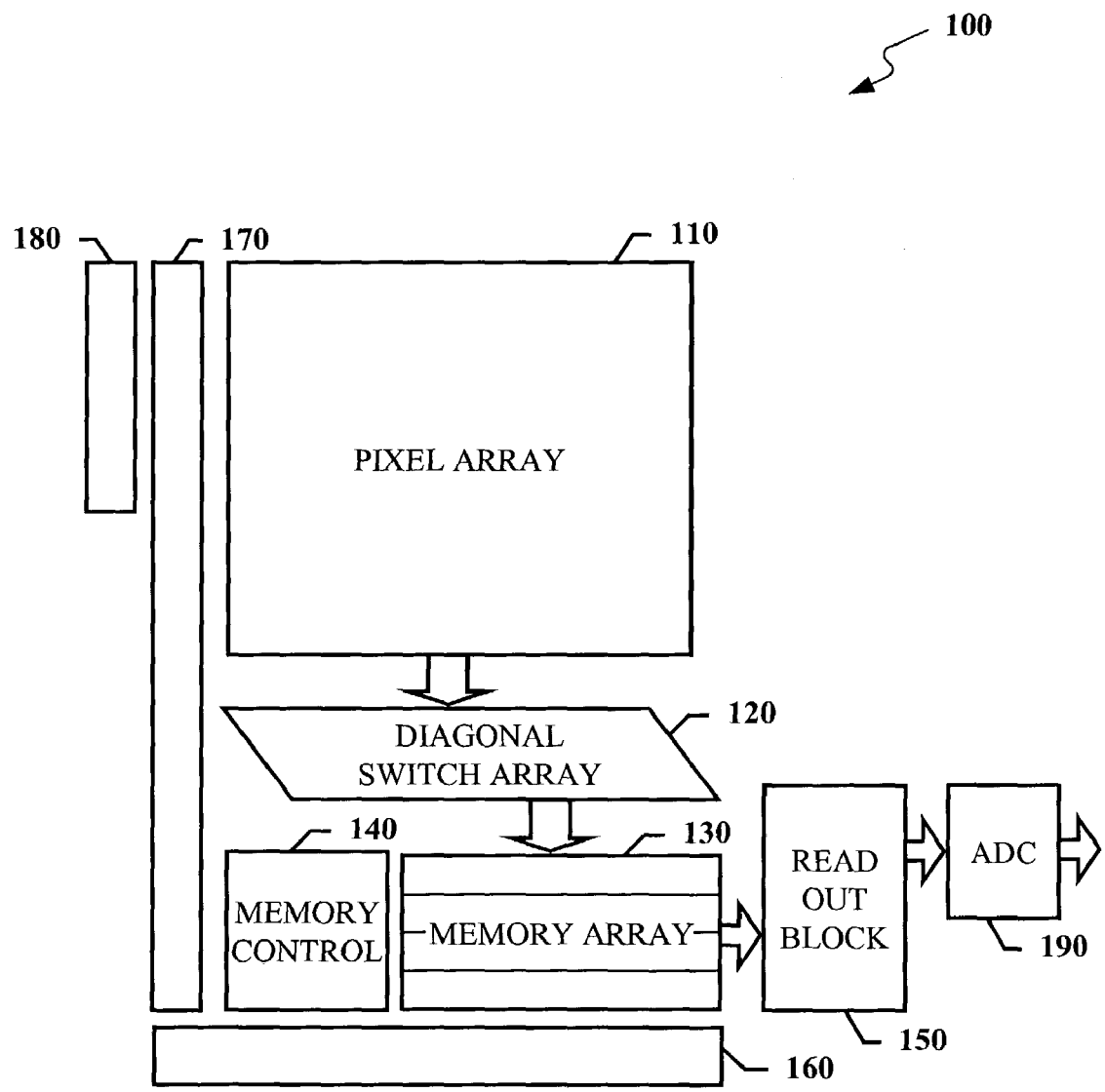
FIG. 1 is a block diagram of an example imager.

FIG. 1 is a block diagram of an example imager 100. The imager 100 uses an imager architecture that is compatible with random-access of pixels, as well as with integration of control circuitry for access of multiple windows of data in response to a single command. The imager 100 can be a CMOS imager built on a single chip, and can be fabricated to be ideally suited for star-tracking applications.

The imager 100 can include an interface tailored to a tracking application (e.g., multiple data fetch from a single command), integration of timing and control, and an on or off-chip Analog to Digital (A/D) converter. These aspects combined with random-access enables the development of a compact, miniature and low-power star-tracker. The imager 100 may have multiple operating modes, including a tracking mode, in which the star-tracker handles data from a few regions of interest (i.e. where the stars are). These regions of interest typically constitute only a fraction of a percent of the total data from the entire field of view.

In addition to the CMOS imager, along with the timing and control circuitry and A/D conversion, being a low-power device, the imager architecture allows a reduction of data transferred to downstream processors. This can provide an order of magnitude reduction in complexity and power, and can significantly enhance miniaturization of the system. Moreover, CMOS imagers are generally radiation-hard (once manufactured in appropriates foundries) not only with respect to ionizing radiation but also with respect to protons and other heavy ions as well, offering great advantages for space-based applications.

The imager 100 includes a control architecture having an on-chip timing and control block that enables program, configuration, sequencing, and readout out of multiple windows with variable size from a single command. The imager 100 can also include an on-chip high accuracy A/D converter 190 (e.g., a high accuracy 13 bit A/D converter). The readout architecture can include imager organization and timing to provide: (1) ultra-low noise (e.g., less than five electrons) during tracking at high readout rate (e.g., 10 MHz), and (2) no smear and minimized motion artifact through suppression of any rolling shutter effect.

The imager 100 can include a pixel array 110, a diagonal switch array 120, a memory array 130, memory controller 140, column controller 160, and row controller 170. The pixel array 110 can be a mega pixel (1024×1024) CMOS imaging array, controlled and sequenced by an on-chip timing and control block. The array 110 can be an active pixel sensor (APS) array, and can include photogate, photodiode, or binned photodiode pixels. For example, the pixels can be photodiode pixels, which each have a common photo-conversion and sense node, at a pixel pitch of 9 µm. The pixel array 110 can be a high performance imager pixel array that is both highly symmetrical and tailored to high performance image capture.

The imager 100 can support and sequence multiple regions of interest that can be of variable sizes, such as eight different windows of up to 8×8 size within a single frame. The imager can support both acquisition and tracking modes, by allowing both full-frame imaging and multi-windowed imaging. This multi-mode imager can be used in space-based applications, such as a miniature star tracker, or terrestrial applications, such as a laser communications system. Thus, a CMOS imager chip employing the present architecture can handle multiple windows of interest simultaneously, provide a simple command interface to streamline operation, and support low noise imaging.

Unlike a conventional CMOS APS that operates in a row-at-a-time fashion, the disclosed APS can operate in a sample-first-read-later mode. In this mode, the pixels corresponding to the windows of the interest (e.g., the regions containing the guide stars) are routed through a programmable diagonal switch array 120 to an on-chip parallel analog memory array 130. The memory array 130 is large enough to hold differential signals from all of the multiple windows for the entire frame. The memory array 130 can be read out using a read out block 150, which can use a source follower or a capacitative transimpedance amplifier (CTIA) readout using a single opamp. The maximum readout rate can be a 10 MHz data rate. This data rate is entirely compatible with a 10 Hz update rate even for a full-frame mode. Additionally, the imager 100 can include one or more programming registers 180 to support various programming and configuration functions.

Figure 2A:
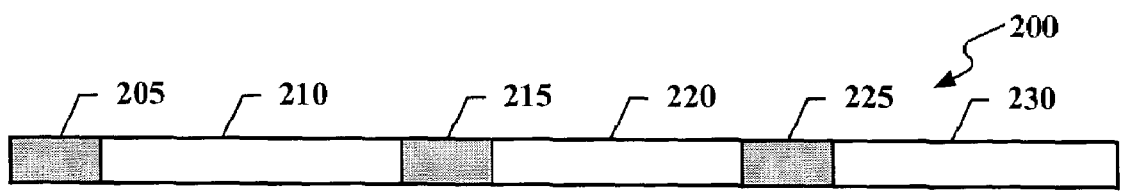
FIG. 2A illustrates a conventional APS row-at-a-time operation.

FIG. 2A illustrates a conventional APS row-at-a-time operation 200. This schematic diagram of the row timing shows a conventional rolling shutter operation in which pixels in each row are simultaneously sampled at the bottom of the column, followed by readout of these pixels. Row N is sampled at 205 and read at 210. Row N+1 is sampled at 215 and read at 220. Row N+2 is sampled at 225 and read at 230. Thus, row sampling and pixel readout phases interleave with each other. This can lead to exposure skew and may impact the accuracy of the imaging system.

Figure 2B:
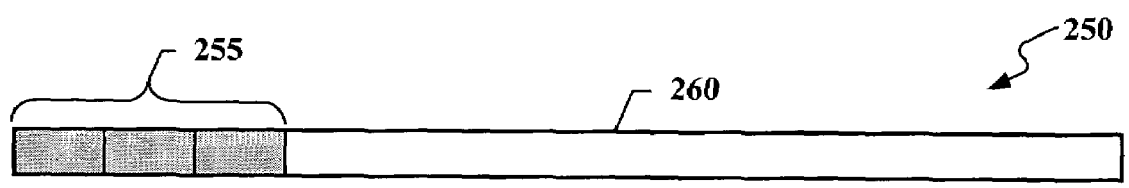
FIG. 2B illustrates a sample-first-read-later operation mode.

FIG. 2B illustrates a sample-first-read-later operation mode 250. In this scheme, all pixels of interest are sampled rapidly into the memory array, with the memory address and diagonal switch-address being internally generated by the on-chip controller. Following the rapid sampling of all windows, the memory array is sequentially read out (e.g., sampling may take about 1 µs, and readout may take about 100 µs). If the window size is smaller than the maximum for the number of windows (e.g., 8×8 for eight windows), the unwanted memory pixels are skipped. Thus, as shown, M rows are sampled at 255, then the M rows are read out at 260. The readout sequence can be entirely controlled by the on-chip controller.

In the multi-window readout mode, the imager can operate with ultra-low noise. A common source of noise in a photodiode type APS pixel is the reset noise at the sense node, when the device is operated in the conventional row-at-a-time readout. In the present imager, row sampling and pixel readout phases can be temporally separated, as shown in FIG. 2B. This allows reset levels for an entire frame to be stored in the memory array, and subsequently used as a reference during the differential readout.

Using this readout architecture, on-chip correlated double sampling (CDS) can be implemented, reducing sense node reset noise. The read noise that remains is generally limited to the noise associated with sampling the pixel signal and reset levels into the memory array. Using a 2 pF sampling capacitance (corresponding to a differential sampling noise of approximately 65 µV RMS), and a nominal pixel conversion gain of 15 µV/e$^-$, the read noise can be expected to be less than 5 e$^-$. For a full-frame mode of operation, the imager can revert to a row-at-a-time readout mode, with consequently higher read noise of around 30 e$^-$.

The imager can be implemented using a twin-well CMOS process provided by Tower Semiconductor Ltd. Of Migdal Haemek, Israel. This is a double poly triple metal 0.5 µm process with low-dark current. The diode can be implemented between the moderately doped n-well (approximately $10^{17}/cm^3$) and the p-epitaxial layer. The epitaxial layer can be chosen to have low doping in order to increase the depletion width, and to provide good quantum efficiency and low diffusion cross talk.

The pixel structure can also be made compatible with reverse-illumination following backside thinning that involves etching the heavily doped p-substrate, with the p-epi forming the natural etch-stop. A special pixel layout that involves passivation of the surface-states can be employed for reducing the dark current to less than 75 pA/cm$^2$. In addition, the pixel layout can be symmetric in order to eliminate non-symmetric responses in the two directions and/or systematic errors.

The imager can also feature a linearizer circuit, such as the column-based hard-to-soft (HTS) circuit developed at Jet Propulsion Laboratories (JPL), in order to provide excellent low-light-level linearity in spite of soft-reset. For further details of the HTS circuit, see U.S. patent application Ser. No. 09/677,972, filed Oct. 2, 2000 and entitled "HIGH-SPEED ON-CHIP WINDOWED CENTROIDING USING PHOTODIODE-BASED CMOS IMAGER", and issued as U.S. Pat. No. 6,519,371 on Feb. 11, 2003. This circuit can be used in the full-frame mode of operation. In the sample-first-read-later mode of operation, the use of CDS minimizes the relevance of soft-reset related issues.

The imager architecture includes an on-chip controller that allows configuration and sequencing of multiple windows, thus allowing simplified integration and configuration of the windows within a given frame. Furthermore, the architecture allows handling of windows that have either row or column address overlap. In order to sequence multiple windows, the on-chip controller can use internal flags to keep track of the current window and the next window to be sequenced.

For sampling the pixel values, a diagonal switch array can be activated to route in only the columns belonging a current window. Once the current window has been sequenced, the controller can skip to the next address, and load in the subsequent window address from an input register. If row-address overlap between windows is detected, the controller can enable two diagonal switch arrays to route the respective columns into separate memory arrays.

The memory array can be organized as 4 parallel arrays of 8 pixels wide, with a height of 65 pixels, with the adjacent memory sub-arrays reserved for corresponding reset and signal values for a given pixel. Thus, the memory array can handle two separate windows at a time, with a total of 8 windows per frame. The window size is also programmable. Table 1 below summarizes the expected performance of an example CMOS imager built using the architecture described.

TABLE 1

| | |
|---|---|
| Operating voltage | 3.3 V |
| Pixel size | 9 µm × 9 µm |
| Format | 1024 × 1024 |
| QE | 60% (peak) |
| Read noise (Non-CDS operation) | 30 electrons |
| Read noise (CDS operation) | 5 electrons |
| Dark current | 0.07 nA/cm$^2$ |
| Full well (1000e$^-$) | 150 |
| Operation mode | Full frame or multi-window |
| Number of sub-windows | Up to 8 (8 × 8) |
| Sub-window size | 8 × 8 (both variable) |
| True CDS operation | Enable or disable |
| Maximum window number with row overlap | 2 (only for 8 × 8) |
| Windows with column overlap | No Limit |
| Timing and control logic | On chip |
| Maximum update rate | >10 kHz |

Table 1 above only describes expected performance for one example implementation. Other implementations may have different performance characteristics.

The sample-first-read-later operation mode can be employed more generally, and the imager need not be integrated onto a single chip. For example, the pixel array could be on a first chip, and the memory and readout block can be on a second chip either above or below the first chip. Vertical interconnects may be used to connect the pixel array and the memory in such an implementation.

The diagonal switch array can contribute to an overall very low power operation mode. For example, in a mode designed to read out multiple arbitrarily sized windows, only a portion of the pixel array may need to be sampled. The diagonal switch array and the sampling mode can be configured such that no current needs to be drawn on pixels that are outside the windows.

By only drawing current to sample pixels that fall in the selected windows, which correspond to regions of interest, a very low power device may result, which can be of particular use in a star tracker system. Moreover, use of one or more diagonal switch arrays in combination with one or more memory arrays, which may be in the focal plane of the chip, can result in a very efficient use of chip space, thus making smaller imaging system possible. By using a diagonal switch array, the imager chip can sample windows in the active pixel array while accessing only those pixels that are to be read into the memory array.

Figure 3:
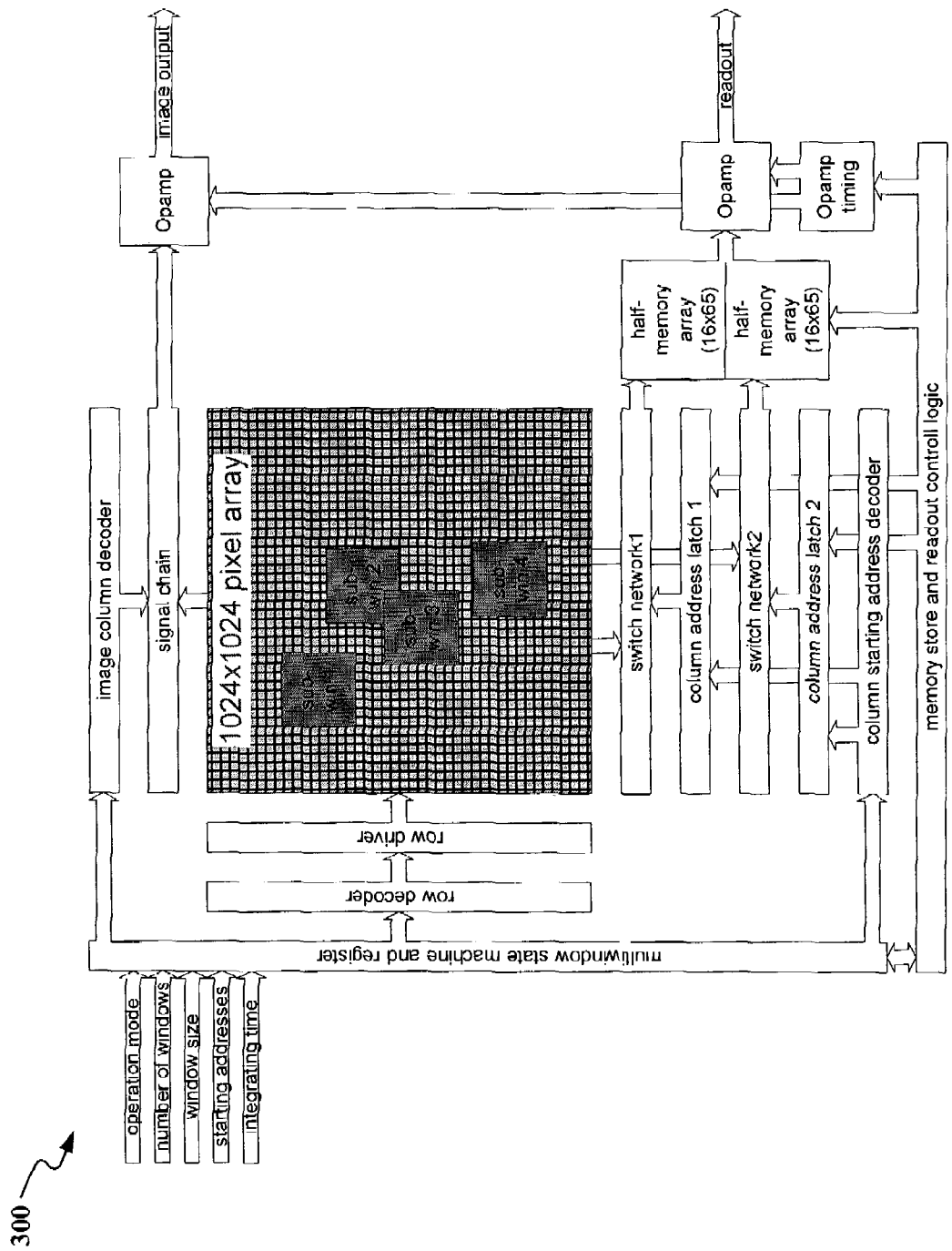
FIG. 3 shows a CMOS multi-window imager according to an implementation.

FIG. 3 shows a CMOS multi-window imager 300 according to an implementation. The imager 300 includes a memory array, which may have logically distinct parts, and corresponding switch network, and the imager 300 supports multiple operation modes, including a full-frame mode, an optical-communication (op-comm) mode, and a star-tracker mode. The full-frame mode may use two pointers, such as described below, to sample and read out the entire pixel array. The op-comm mode may use two pointers in either a CDS or TDS (Time Difference Sampling) mode, such as described below, to sample and read out up to two windows, with no overlap, and the windows being of variable size up to 32×32. The star-tracker mode may use one pointer in either a CDS or a TDS mode, such as described below, to sample and read out up to eight windows, with two-window overlap allowed, and the windows being of variable size up to 8×8.

Providing both TDS and CDS modes as described, provides additional versatility for the imager. The CDS mode provides reset noise suppression, and the TDS mode runs faster. Thus, an imager chip can be configured to operate in one or more different modes based on requirements for the larger system. Having both TDS and CDS modes available can be of particular use when the APS array is a photodiode array.

As shown, switch networks and corresponding column address latches are used to sample the pixel array into the memory. The various arrows in FIG. 3 illustrate in general how data propagates through the imager 300. In addition, the control logic includes a multi-window state machine and register, memory store and readout control logic, column starting address decoder, row decoder, row driver, image column decoder, and signal chain components. Various opamps and opamp timing control circuitry can be used to facilitate image output and readout. Moreover, programmable features of the imager 300 can be configured using inputs as shown: (1) operational mode, (2) number of windows, (3) window size, (4) starting address, and (5) integrating time.

Multiple windows, corresponding to multiple objects of interest, can be handled using a single command. Four example windows, including two overlapping windows, are shown on the pixel array. In the example implementation shown, up to eight different regions of interest can be downloaded from the imager 300 using a single command. Thus, multiple objects can be tracked simultaneously using the imager 300. Such multi-object tracking can be very advantageous in autonomous navigation and/or star tracking applications. Other numbers of windows and window size ranges are also possible.

Figure 4:
FIG. 4 illustrates timing information for multiple operation modes.

FIG. 4 illustrates timing information 400 for multiple operation modes. The timing information 400 includes operations to sample data needed for correlated double sampling. As shown, a reference level, a reset level and a signal level can be stored for each pixel. Moreover, while obtaining the signal levels for frame 1, the reset levels for frame 2 can also be obtained; the signal level comes at the end of integration, but the end of integration is also the beginning of integration of the next frame, and the reset level comes at the beginning of integration. By overlapping the frame sampling in this fashion, pixel sampling is made into a continuous operation for faster sampling. The imager can carry an extra bit of memory where the reference for the next frame can be stored. This can have additional advantages when used with a photodiode-based pixel array to perform correlated double sampling (CDS) or correlated quadruple sampling as described below.

As shown in FIG. 4, different shades are used to illustrate sample signal, reset, sample reset, and read pixel operations in multiple timing diagrams. The first timing diagram corresponds to full-frame TDS mode and/or an op-comm TDS mode. The second timing diagram corresponds to an op-comm CDS mode. The third timing diagram corresponds to a star-tracker CDS/TDS mode. The first line shows the integrate pointer location and frame [m+k,i], the second line shows the read pointer location and frame [k,j], and the third line is the readout phase for a given row and frame [n,l]. For the star-tracker mode, there is only one pointer.

Figure 5:
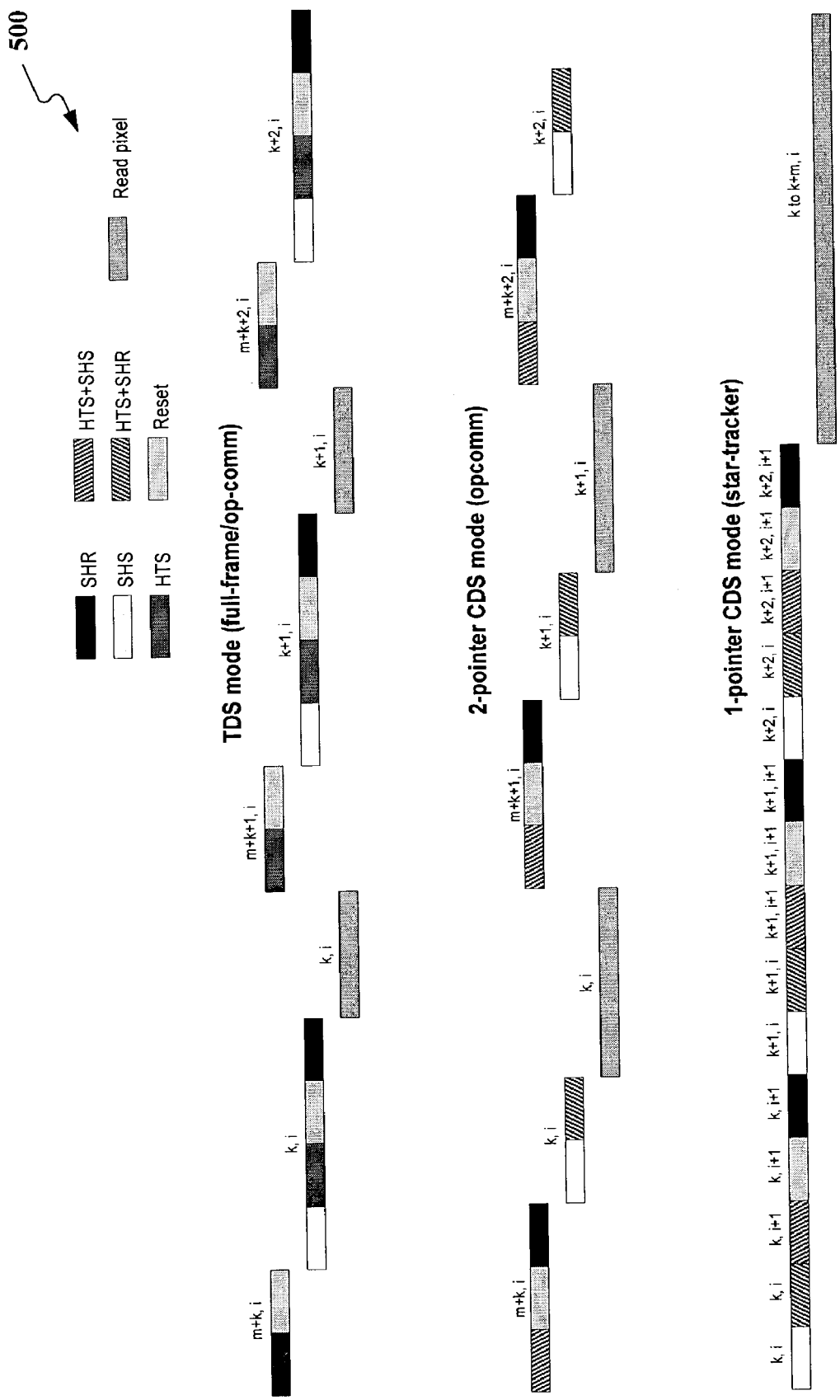
FIG. 5 illustrates additional timing information for multiple operation modes.

FIG. 5 illustrates additional timing information 500 for multiple operation modes. The timing information 500 includes operations to sample data needed for correlated quadruple sampling. When two samples are taken, the imager may still be susceptible to flicker (1/f) noise, common mode noise, power supply rejection, and/or drift in the system. Because the two samples are temporally separate, any kind of drift (e.g., drift in the device, system, the clock, etc.) can affect the noise level. By taking four samples to perform four-point CDS, or correlated quadruple sampling (CQS), the 1/f noise and common mode noise may be reduced, and power supply rejection and drift issues may be minimized.

Initially, two samples A and B that are very close to each other are taken. Then two more samples C and D are taken very close together at a later time. The final result is the difference of the differences: (A−B)−(C−D). Such four-point CDS can resolve various noise issues created by a particular system. Moreover, an imager with both two-point CDS and four-point CDS modes may be used in more systems due to the programmable versatility.

As shown in FIG. 5, different shades are used to illustrate sample and hold reset (SHR), sample and hold signal (SHS), HTS, HTS+SHS, HTS+SHR, reset, and read pixel operations in multiple timing diagrams. The first timing diagram corresponds to TDS mode (full-frame/op-comm). The second timing diagram corresponds to a 2-pointer CDS mode (op-comm). The third timing diagram corresponds to a 1-pointer CDS mode (star-tracker). The first line shows the integrate pointer location and frame [m+k,i], the second line shows the read pointer location and frame [k,j], and the third line is the readout phase for a given row and frame [n,l]. For the star-tracker mode, there is only one pointer. Moreover, in 2-pointer mode, the sample values for the integrate pointer phase can be stored in the memory array, and those during the read pointer phase can be stored in the single-line memory; in 4-pointer mode, all four sample values can be stored in the memory array.

Figure 6:
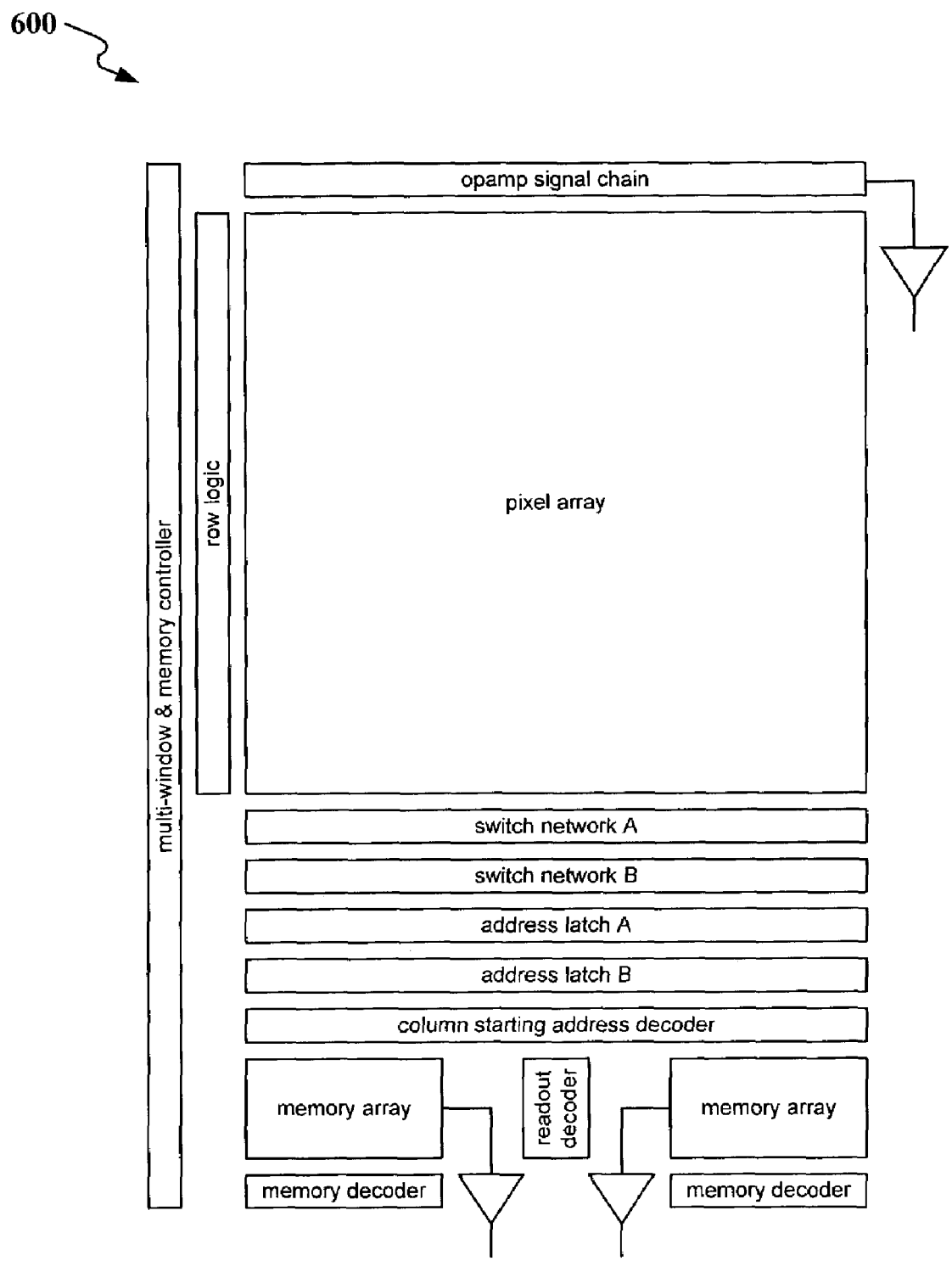
FIG. 6 shows a CMOS multi-window imager according to an implementation.

FIG. 6 shows a CMOS multi-window imager 600 according to an implementation. The imager 600 includes two separate memory arrays and memory decoders. This memory arrangement can provide architectural advantages when supporting multiple windowing frameworks. For example, the imager 600 can be configurable to run in a first mode, where up to eight 8×8 windows can be read out, and a second mode, where up to two 32×32 windows can be read out.

In addition to the separate memory arrays, the imager 600 includes two separate diagonal switch arrays: switch networks A and B and address latches A and B. As shown, the imager 600 includes additional components, such as described above, including a multi-window & memory controller, row logic, opamp signal chain, column starting address decoder, and readout decoder. This layout provides an efficient use of hardware in this example implementation having two distinct multi-window modes.

Figure 7:
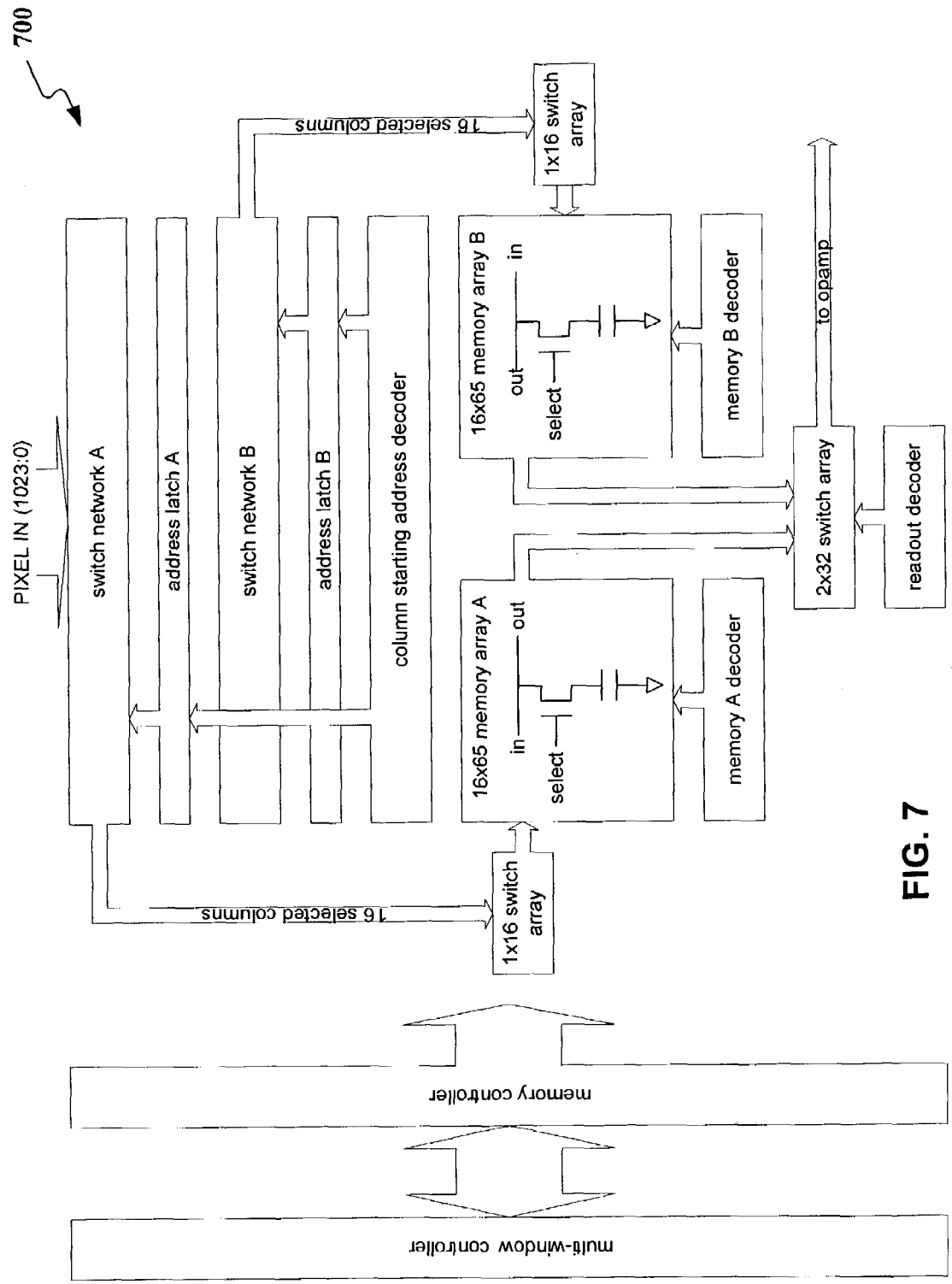
FIG. 7 illustrates additional details regarding the memory block and control logic shown in FIG. 6.

FIG. 7 illustrates additional details 700 regarding the memory block and control logic shown in FIG. 6. These additional details 700 include a multi-window controller, memory controller, and various process flow arrows.

Figure 8:
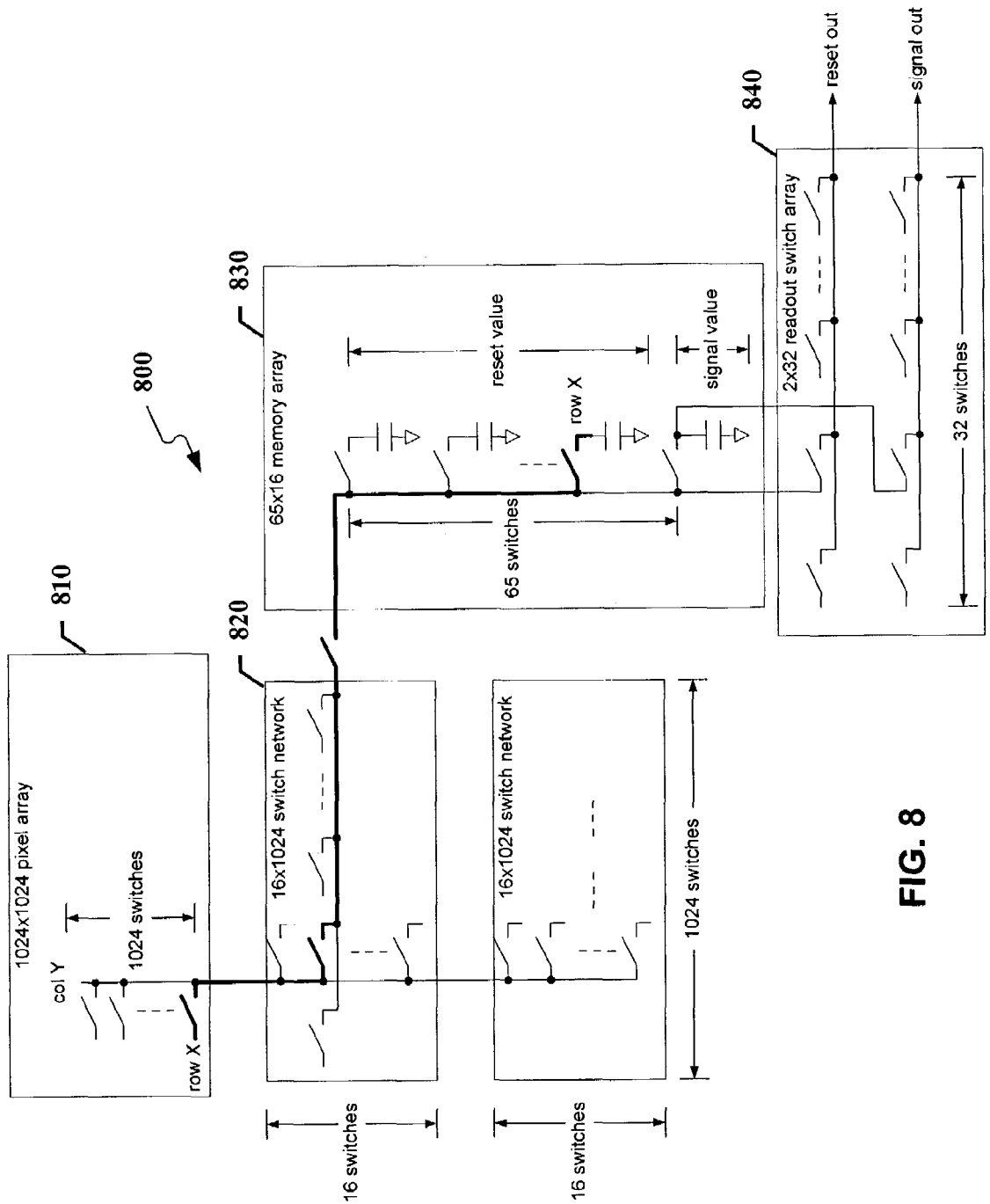
FIGS. 8 and 9 illustrate selected portions of a pixel array, switch network, memory array, and readout switch array according to an implementation.
Figure 9:
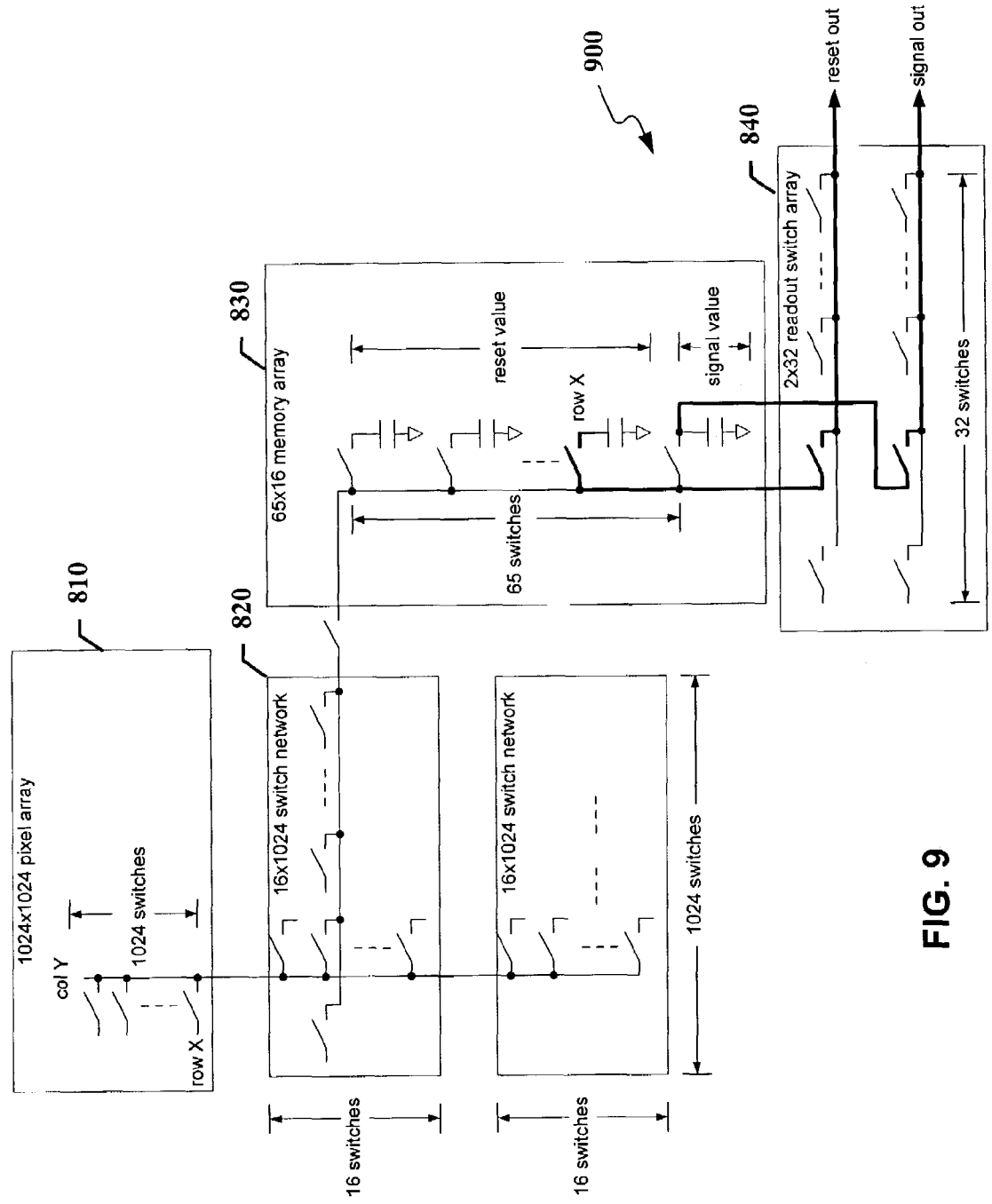

FIGS. 8 and 9 illustrate selected portions of a pixel array 810, switch network 820, memory array 830, and readout switch array 840 according to an implementation. A single column of the pixel array 810 provides output for a selected row to the switch network 820. The switch network 820 selects a column to route into an appropriate location in the memory array 830. The memory array 830 is a 65×16 memory array made up of capacitors.

FIGS. 8 and 9 illustrate a mode of operation in which reset values are stored, and as signal values come, a signal value is read out, and then the reset value of the capacitor that has just been emptied is quickly stored. As shown in the memory array 830, there are sixty-four reset values, but one signal value. FIG. 8 illustrates sampling 800. FIG. 900 illustrates readout 900.

Figure 10:
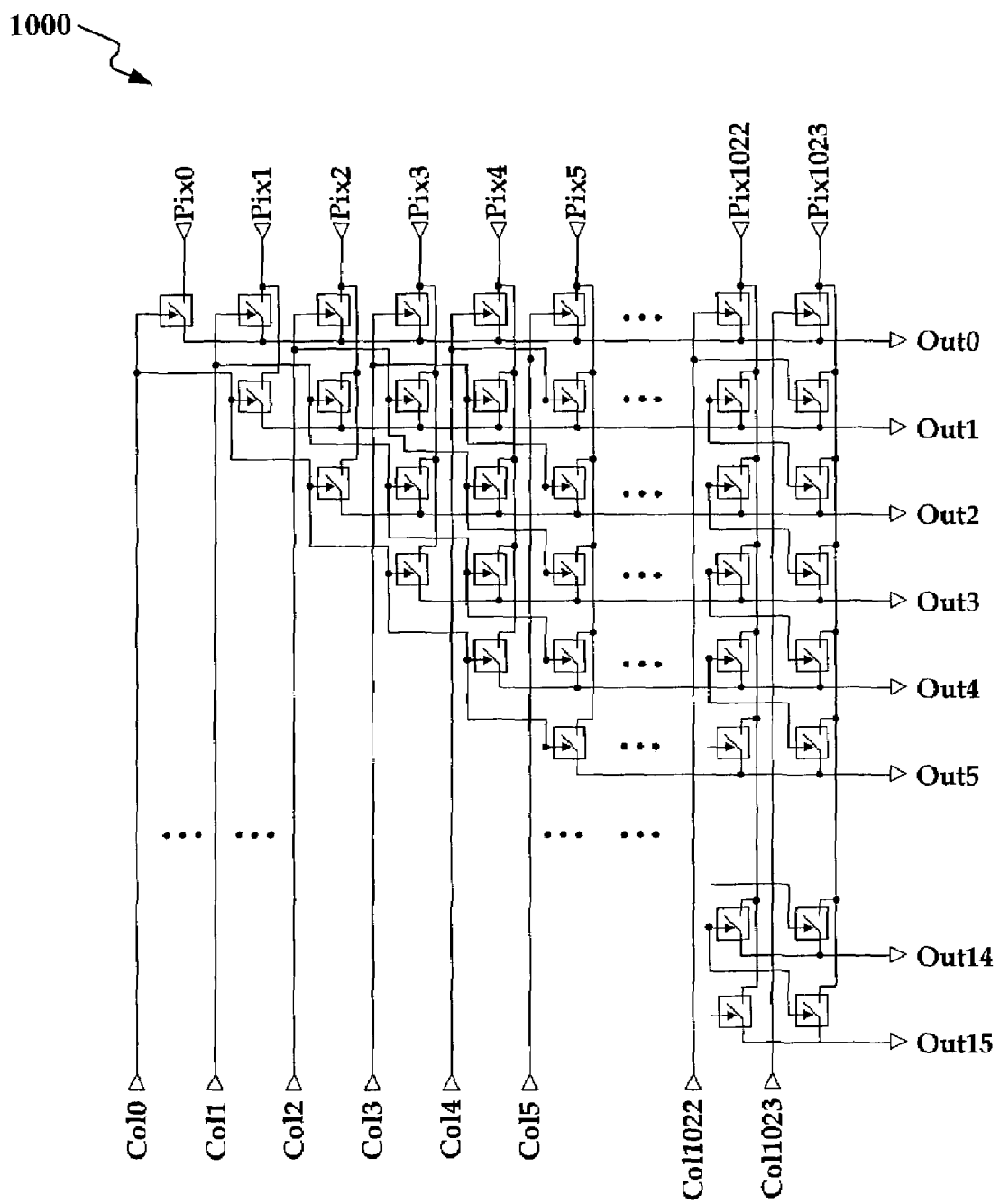
FIG. 10 illustrates a diagonal switch network.

FIG. 10 illustrates a diagonal switch network 1000. The switch network 1000 allows window-based addressing, such that a single address can be used to specify multiple pixels from a window to be sampled. For example, when reading an 8×8 block of pixels, eight contiguous pixels are stored in the memory (e.g., routed into the bus) by asserting a single address that makes eight diagonal connections together. Thus, multiple pixels are sampled in one shot.

Figure 11:
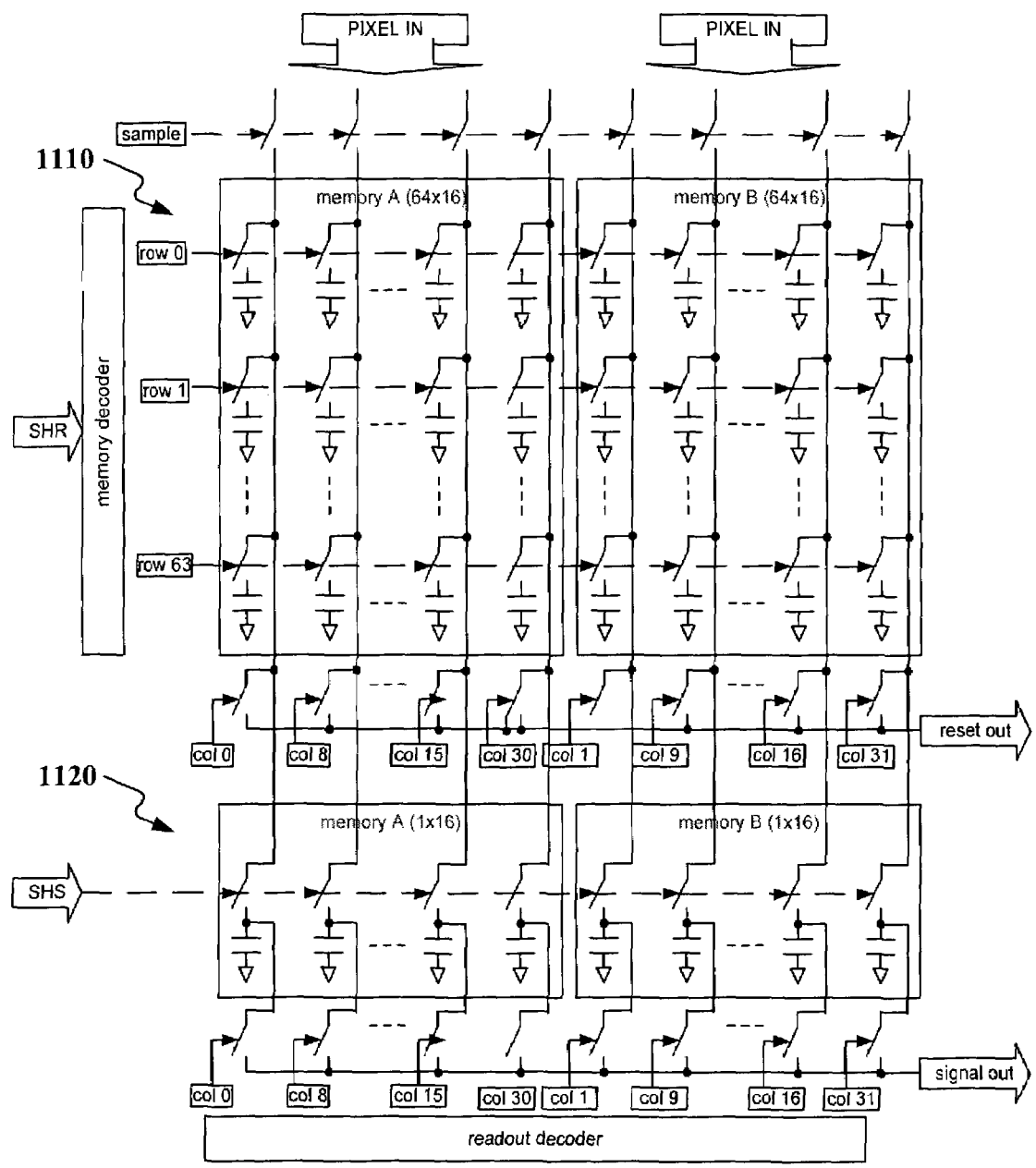
FIG. 11 illustrates pixel sample and readout in an example op-comm mode of operation.

FIG. 11 illustrates pixel sample and readout in an example op-comm mode of operation. In this implementation, the signal values are stored on the bottom capacitors 1120, labeled memory A (1×16) and memory B (1×16). The reset values are stored on the top capacitors 1110, labeled memory A (64×16) and memory B (64×16). When storing mostly resets, as the signal becomes available, the signal can be quickly read out and the reset for the next frame can be obtained. Thus, a reset value that has been read out can quickly be replaced with the new reset value for the next frame, providing a very efficient sampling and readout implementation.

Figure 12:
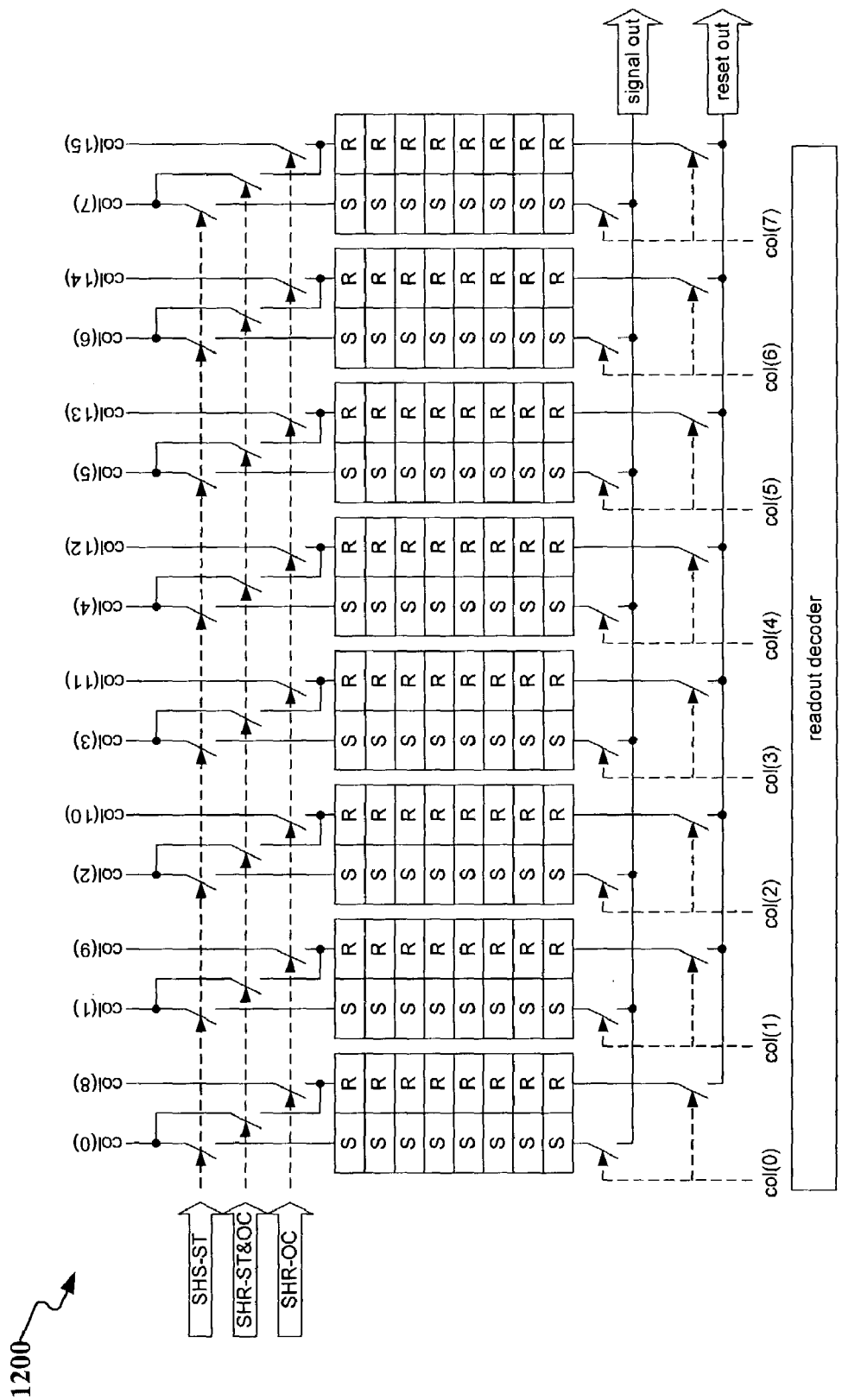
FIG. 12 illustrates an example CMOS imager memory architecture for improved capacitor matching.

FIG. 12 illustrates an example CMOS imager memory architecture 1200 for improved capacitor matching. Corresponding signal and reset values for the pixels are stored on adjacent capacitors. This can be done using the switch network(s) such as described above to route the values such that a signal value and its corresponding reset value are always stored in adjacent capacitors. For example, the signal values can be stored on odd sets of capacitors, and the reset values can be stored on even sets of capacitors, such that the values that are ultimately correlated (e.g., signal minus reset) are stored on adjacent sets of capacitors.

This can result in very nice matching properties. For example, all the adjacent capacitors can be very well matched through a common centroid layout, in which gradient errors are averaged out. This layout technique reduces susceptibility to process errors, and can reduce fixed pattern noise.

Figure 13:
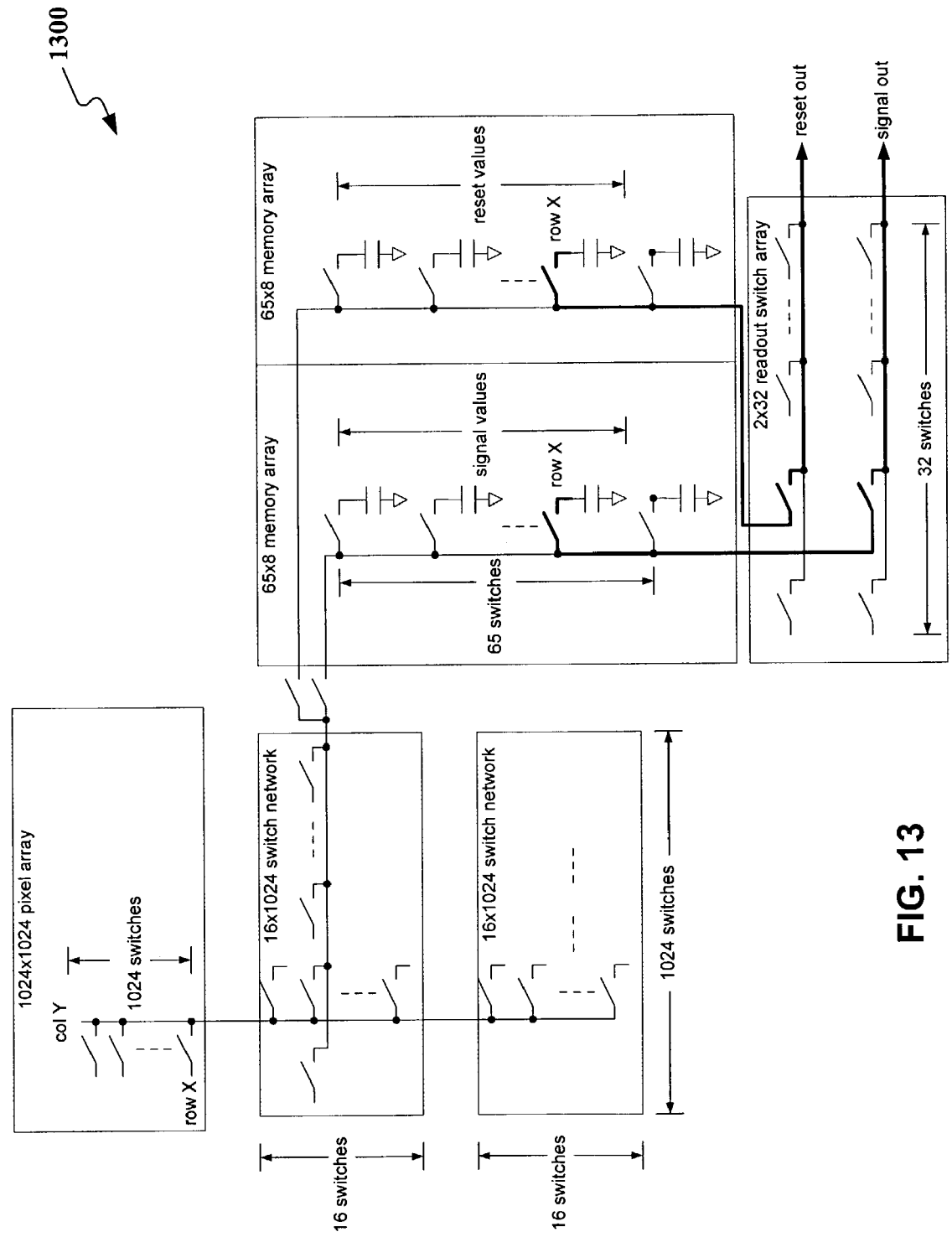
FIG. 13 illustrates another operational mode applied to the hardware shown in FIGS. 8 and 9.

FIG. 13 illustrates another operational mode applied to the hardware shown in FIGS. 8 and 9. In this operational mode, both signal and reset values are sampled for all the pixels in the region(s) of interest, and these sampled values are used to reduce fixed pattern noise. The sampled signal and reset values can be stored in the memory array on adjacent capacitors, such as described above. As shown, readout 1300 uses the same capacitors in the memory array as in FIGS. 8 and 9, but now the capacitors store multiple signal values and multiple corresponding reset values in adjacent capacitors to reduce fixed pattern noise.

Figure 14:
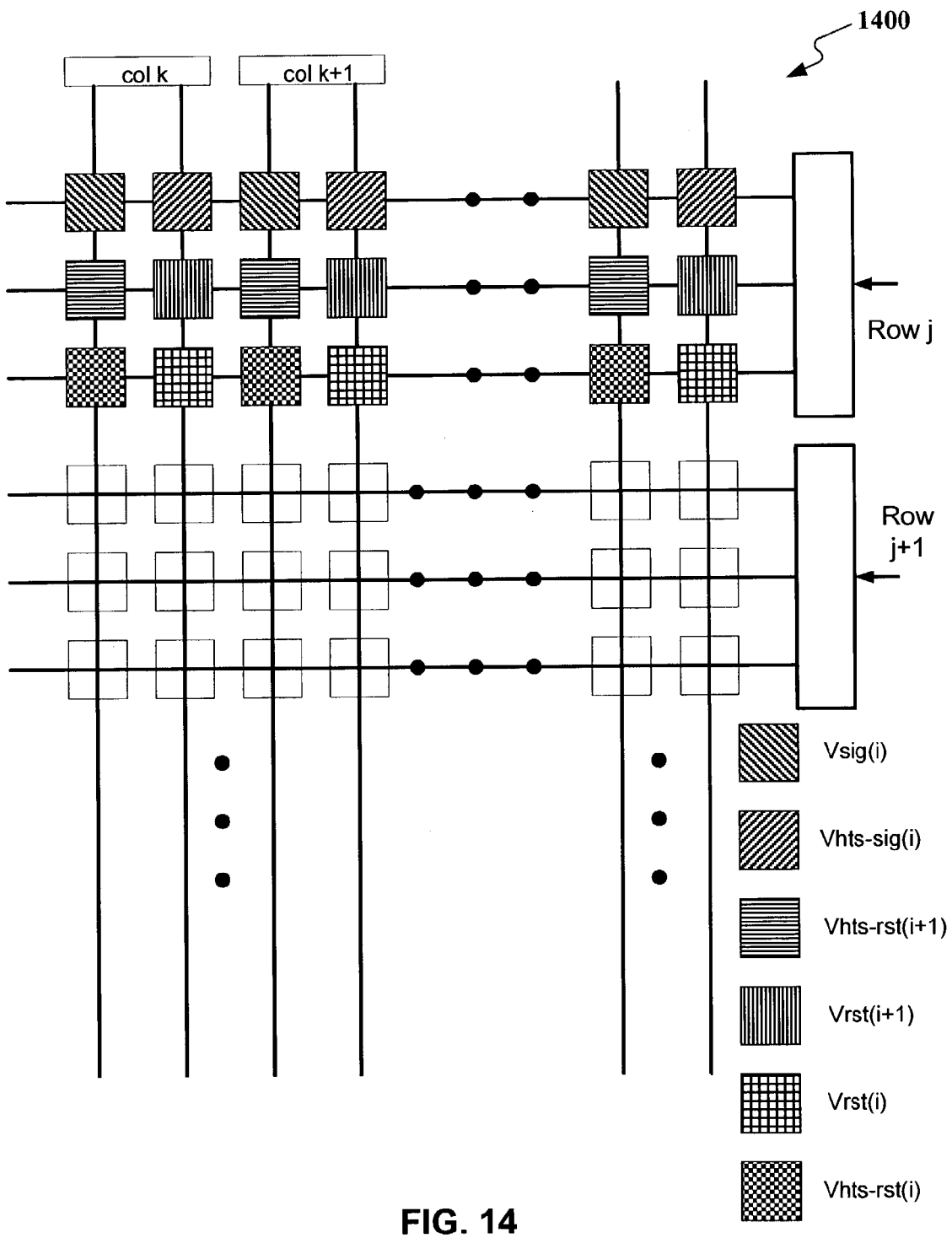
FIG. 14 illustrates an example four sample mode of operation.

FIG. 14 illustrates an example four sample mode of operation 1400. Four-point CDS can help address flicker noise, common mode noise, power supply rejection, and/or drift issues in a particular system, and an imager with both two-point CDS and four-point CDS modes provides versatility. The example four sample mode illustrated in FIG. 14 has been improved by effectively reducing the number of subtractions performed.

Instead of taking the difference of differences for four sampled levels A, B, C, and D, as in the result being (A−B)−(C−D), the sampled levels can be arranged such that only one subtraction is performed, as in the result being (A+D)−(B+C). The additions can be performed by dumping two capacitors simultaneously. Thus, a single subtraction can be used to obtain the correlated quadruple sampling (CQS) result.

As shown in FIG. 14, the signal and reset values are placed in the memory array according to a pattern that eliminates the need for extra subtractions during CQS. Table 2 shows the various signals and their color and corresponding pattern in FIG. 14.

TABLE 2

| Signal | Color | Pattern |
|---|---|---|
| $V_{sig(i)}$ | Green | |
| $V_{hts\text{-}sig(i)}$ | Brown | |
| $V_{hts\text{-}rst(i+1)}$ | Blue | |
| $V_{rst(i+1)}$ | Red | |
| $V_{rst(1)}$ | Yellow | |
| $V_{hts\text{-}rst(1)}$ | Orange | |

Each column has two buses that are connected to the differential signal chain. In a read mode, $V_{sig(i)}$ and $V_{hts\text{-}rst(i)}$ are dumped on the same bus, while $V_{hts\text{-}sig(i)}$ and $V_{rst(i)}$ are routed simultaneously to the adjacent buses, such that $V_{out} = V_{rst(i)} - V_{sig(i)} + V_{hts\text{-}sig(i)} - V_{hts\text{-}rst(i)} = V_{rst(i)} - V_{sig(i)}$.

Figure 15:
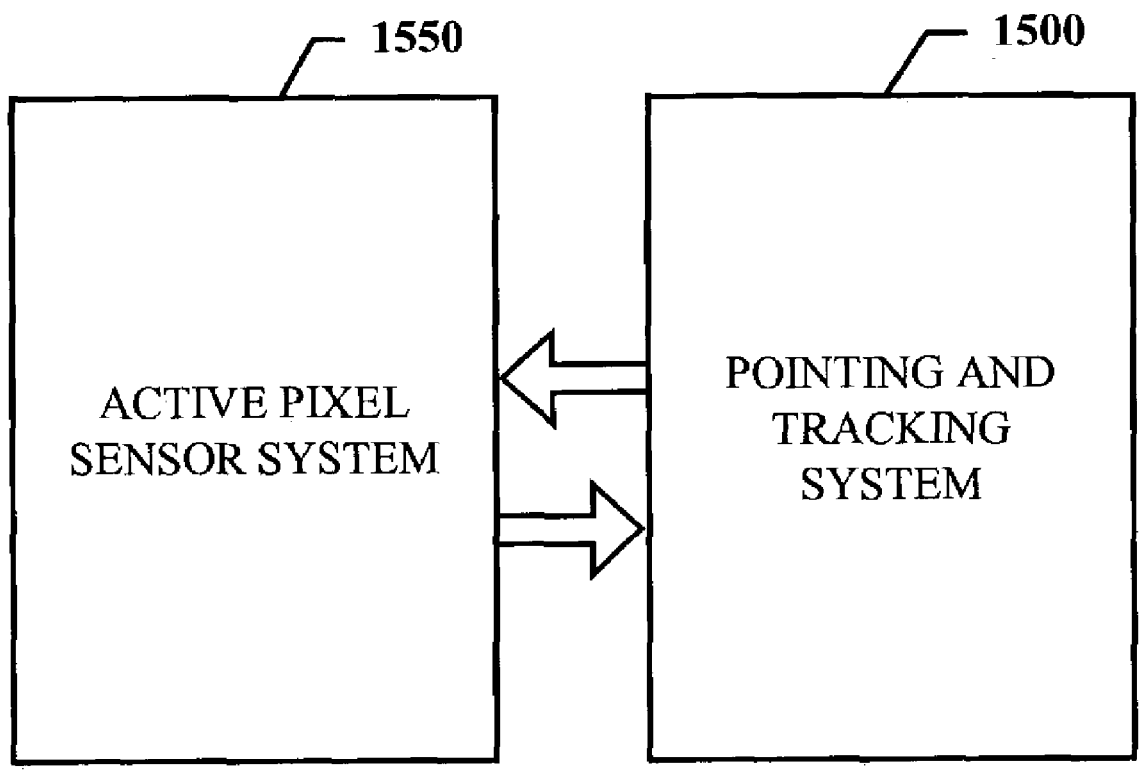
FIG. 15 is a block diagram illustrating an example imager application.

FIG. 15 is a block diagram illustrating an example imager application. A pointing and tracking system 1500 communicates with an active pixel sensor system 1550, such as described above. The active pixel sensor system 1550 can be integrated onto a single CMOS chip and provide an interface that allows multiple arbitrarily placed windows to be specified using a single command from the pointing and tracking system 1500.

The pointing and tracking system 1500 can be part of a larger control system in a space-based application, such a satellite control system, or a terrestrial application, such as autonomous navigation and/or laser communications. Thus, the example system can be used to efficiently track multiple points of interest in a field of view for various pointing, tracking, navigation, and/or communication applications.

Other embodiments may be within the scope of the following claims.

What is claimed is:

1. An integrated semiconductor device comprising:
   an active pixel sensor array;
   a diagonal switch array coupled with the active pixel sensor array;
   a memory array coupled with the diagonal switch array;
   a readout block coupled with the memory array; and a controller configurable to operate the diagonal switch array, the memory array, and the readout block in a tracking mode to read out two or more windows in the active pixel sensor array.

2. The device of claim 1, the controller being further configurable to operate the diagonal switch array, the memory array, and the readout block in a second mode.

3. The device of claim 2, wherein the tracking mode employs a sample-first-read-later readout scheme, and the second mode comprises a full-frame mode that employs a row-at-a-time readout scheme.

4. The device of claim 2, wherein the controller operates the diagonal switch array, the memory array, and the readout block in the tracking mode to effect correlated double sampling of pixels in the active pixel sensor array.

5. The device of claim 4, wherein the pixels in the active pixel sensor array comprise photodiode pixels.

6. The device of claim 5, wherein the memory array comprises a memory array configured to handle two separate windows at a time, with a total of eight windows per frame.

7. The device of claim 6, wherein a window size comprises a programmable window size.

8. The device of claim 5, wherein the diagonal switch array comprises one or more low-power, programmable diagonal switch arrays configurable to route a pixel common to two windows into separate memory elements.

9. The device of claim 5, wherein the active pixel sensor array comprises a symmetric pixel array.

10. The device of claim 5, further comprising an A/D converter.

11. The device of claim 10, wherein the readout block comprises a capacitative transimpedance amplifier.

12. A method comprising:
sampling multiple rows and multiple columns of an active pixel sensor array into an on-chip analog memory array; and
reading out the multiple rows and multiple columns sampled in the on-chip memory array to provide image data with reduced motion artifact;
wherein said sampling multiple rows and multiple columns comprises sampling multiple arbitrarily placed windows in the active pixel sensor array; and
wherein said sampling multiple arbitrarily placed windows comprises sampling in a first of two or more operation modes, the first operation mode comprising a tracking mode having low power operation based at least in part on drawing current for sampling only on pixels from the active pixel sensor array that fall in the multiple arbitrarily placed windows.

13. The method of claim 12, wherein sampling multiple rows and multiple columns comprises sampling reset and signal levels of photodiode pixels in the active pixel sensor array.

14. The method of claim 13, wherein reading out the multiple rows and multiple columns comprises performing correlated double sampling using the sampled reset and signal levels.

15. The method of claim 12, wherein sampling multiple arbitrarily placed window further comprises sampling reset and signal levels of photodiode pixels such that correlated signals fall on adjacent capacitor blocks in the on-chip analog memory array, the adjacent capacitor blocks being laid out in a common centroid fashion to reduce fixed pattern noise.

16. The method of claim 15, wherein reading out the multiple rows and multiple columns comprises performing correlated double sampling for the arbitrarily placed windows.

17. The method of claim 15, wherein reading out the multiple rows and multiple columns comprises performing correlated quadruple sampling for the arbitrarily placed windows.

18. An imaging system comprising:
an active pixel sensor array;
a memory array coupled with the active pixel sensor array;
a readout block coupled with the memory array; and
a controller configurable to operate the memory array, the readout block in multiple modes, including a first mode employing a sample-first-read-later readout scheme, and
a diagonal switch array coupled between the active pixel sensor array and the memory array.

19. The imaging system of claim 18, wherein the first mode allows readout of multiple windows in the active pixel sensor array using a single command.

20. The imaging system of claim 19, wherein the controller comprises a memory controller, a row controller, and a column controller.

21. The imaging system of claim 19, wherein the multiple windows comprise two or more arbitrarily placed windows.

22. The imaging system of claim 19, wherein the multiple windows have a programmable size.

23. The imaging system of claim 19, wherein a second mode of the multiple modes allows readout of up to two windows in the active pixel sensor array using another single command.

24. The imaging system of claim 19, wherein the diagonal switch array comprises a low-power diagonal switch array when used with the first mode.

25. The imaging system of claim 18, the controller being further configurable to operate the memory array, and the readout block in the first mode to effect correlated double sampling of pixels in the active pixel sensor array.

26. The imaging system of claim 25, the controller being further configurable to operate the memory array, and the readout block in the first mode to effect correlated quadruple sampling of pixels in the active pixel sensor array.

27. The imaging system of claim 18, wherein the memory array comprises adjacent capacitors in a common centroid layout, and the controller arranges correlated values on the adjacent capacitors to reduce fixed pattern noise when performing correlated sampling of signal levels and reset levels.

28. An imaging system comprising:
an active pixel sensor array;
a memory array coupled with the active pixel sensor array;
a readout block coupled with the memory array; and
a controller configurable to operate the memory array, and the readout block in multiple modes, including a first mode employing a sample-first-read-later readout scheme, and
wherein the memory array comprises adjacent capacitors in a common centroid layout, and the controller arranges correlated values on the adjacent capacitors to reduce fixed pattern noise when performing correlated sampling of signal levels and reset levels, and wherein the active pixel sensor array comprises a photodiode array, each photodiode having a common photoconversion and sense node.

29. The imaging system of claim 28, wherein the active pixel sensor array further comprises a symmetric pixel array.

30. The imaging system of claim 29, further comprising an A/D converter.

31. The imaging system of claim 30, wherein the readout block comprises a capacitative transimpedance amplifier.

32. The imaging system of claim 30, further comprising a star-tracker system in communication with an active pixel sensor system comprising the active pixel sensor array, a diagonal switch array, the memory array, the readout block, the A/D converter, and the controller.

33. An integrated semiconductor device comprising:
an active pixel sensor array;
a memory array coupled with the active pixel sensor array;
a readout block coupled with the memory array; and
a controller configurable to operate the memory array and the readout block to perform four-point correlated double sampling, wherein the controller operates the memory array and the readout block to perform four-point correlated double sampling by placing correlated signals on adjacent capacitor blocks that have been laid out in the memory array in a common centroid fashion.

34. The device of claim 33, the controller being further configurable to operate the memory array and the readout block to perform two-point correlated double sampling.

35. An integrated semiconductor device comprising:
an active pixel sensor array;
a memory array coupled with the active pixel sensor array;
a readout block coupled with the memory array; and
a controller configurable to operate the memory array and the readout block to perform four-point correlated double sampling,
wherein the controller operates the memory array and the readout block to perform four-point correlated double sampling by placing differential signals on capacitor blocks in the memory array such that only one subtraction is used for each four samples.

36. An integrated semiconductor device comprising:
an active pixel sensor array;
a memory array coupled with the active pixel sensor array;
a readout block coupled with the memory array;
a controller configurable to operate the memory array and the readout block to perform four-point correlated double sampling, and
a diagonal switch array coupled between the active pixel sensor array and the memory array, wherein the controller is further configurable to operate the diagonal switch array, the memory array, and the readout block in a tracking mode to read out multiple windows per frame in the active pixel sensor array.

* * * * *